(12) United States Patent  (10) Patent No.: US 6,590,534 B1
Kroll et al.  (45) Date of Patent: Jul. 8, 2003

(54) ELECTRONIC CAR LOCATOR (75) Inventors: Mark W. Kroll, Simi Valley, CA (US); Karl J. F. Kroll, Maple Grove, MN (US)

(73) Assignee: Kroll Family Trust, Simi Valley, CA (US)

( * ) Notice: Subject to any disclaimer, the term of this patent is extended or adjusted under 35 U.S.C. 154(b) by 0 days.

(21) Appl. No.: 09/739,470

(22) Filed: Dec. 16, 2000

(51) Int. Cl.⁷ .................................................. G01S 5/04
(52) U.S. Cl. ........................ 342/442; 342/419; 342/457
(58) Field of Search ................................. 342/442, 419, 342/457

(56) References Cited

U.S. PATENT DOCUMENTS

| | | |
|---|---|---|
| 4,598,272 A | 7/1986 | Cox |
| 4,633,215 A | 12/1986 | Anders et al. |
| 4,977,509 A | 12/1990 | Pitchford et al. |
| 5,010,343 A * | 4/1991 | Andersson ................. 342/432 |
| 5,089,803 A | 2/1992 | Bohn |
| 5,140,933 A | 8/1992 | Nishina et al. |
| 5,218,367 A | 6/1993 | Sheffer et al. |
| 5,224,059 A | 6/1993 | Nitta et al. |
| 5,227,803 A * | 7/1993 | O'Connor et al. .......... 342/442 |
| 5,233,938 A | 8/1993 | Lalo |
| 5,289,163 A * | 2/1994 | Perez et al. ................. 342/419 |
| 5,299,525 A | 4/1994 | Romesburg |
| 5,311,197 A | 5/1994 | Sorden et al. |
| 5,379,047 A | 1/1995 | Yokev et al. |
| 5,583,517 A | 12/1996 | Yokev et al. |
| 5,592,180 A | 1/1997 | Yokev et al. |
| 5,596,330 A | 1/1997 | Yokev et al. |
| 5,609,121 A | 3/1997 | Gross |
| 5,729,196 A | 3/1998 | Aljadeff et al. |
| 5,731,785 A * | 3/1998 | Lemelson et al. .......... 342/386 |
| 5,783,853 A | 7/1998 | Mladenovic |
| 5,786,758 A | 7/1998 | Bullock |
| 5,802,016 A | 9/1998 | Kubota et al. |
| 5,918,183 A | 6/1999 | Janky et al. |
| 5,945,948 A | 8/1999 | Buford et al. |
| 5,973,643 A | 10/1999 | Hawkes et al. |
| 5,982,324 A | 11/1999 | Watters et al. |
| 5,983,161 A | 11/1999 | Lemelson et al. |
| 6,002,342 A | 12/1999 | Leitch |
| 6,016,119 A | 1/2000 | Krasner |
| 6,023,218 A | 2/2000 | Tremblay |
| 6,184,830 B1 * | 2/2001 | Owens ........................ 342/424 |

* cited by examiner

Primary Examiner—Theodore M. Blum (57) ABSTRACT

A method of using radio frequency communications is taught for location of an automobile for the convenience of the owner. In addition, a method of using magnetic dead reckoning is taught. Methods and apparatus using cellular phones are taught.

7 Claims, 9 Drawing Sheets

ELECTRONIC CAR LOCATOR

This application is related to the following issued patent: U.S. Pat. No. 6,115,597 (Disposable Emergency Cellular Phone) and to the following applications: U.S. Ser. No. 09/098,315 filed Jun. 16, 1998 (Public Service Answering Point With Automatic-Triage Capability); U.S. Ser. No. 09/406,067 filed Sep. 24, 1999 (Aircraft Internal EMI Detection and Location); and U.S. Ser. No. 09/584,326 filed may 30, 2000 (Generic Number Cellular Telephone). These issued and pending patents are wholly incorporated by reference.

BACKGROUND OF THE INVENTION

The inability to locate one's parked car can be very annoying. This problem is so common that many parking ramps have golf carts to drive people around to help them find their cars.

In a flat open-air parking lot, a GPS receiver could be used. However, the GPS signal is not present inside multi-level parking ramps and thus cannot be used alone for car location.

A large number of inventions have been directed toward the problem of locating cars. These can basically be classified into two types. The mechanical or flashing light identifier is the first type. The second type is for location of the car in an emergency.

Illustrative of the patents of the first type is the invention of Bohn (U.S. Pat. No. 5,089,803) in which various flags and flashing lights are mounted on the car. The invention of Nashina, et al. (U.S. Pat. No. 5,140,933) features a magnetically mounted flag. The invention of Lalo (U.S. Pat. No. 5,233,938) features a flag that mounts in a window. Romesburg (U.S. Pat. No. 5,299,525) teaches a flag mounted on an automobile antenna. Gross (U.S. Pat. No. 5,609,121) teaches an essentially fluorescent flag. Tremblay (U.S. Pat. No. 6,023,218) teaches a flashing light for the roof of the car. Bullock (U.S. Pat. No. 5,786,758) teaches lights and shades for identifying the car, and Anders, et al. (U.S. Pat. No. 4,633,215) teaches a bright colored flag and a flashing bulb on the end of a mast.

Car locators of the emergency type teach activation by an accident or a theft report. They then typically rely on a GPS signal or some other conventional location technique such as cellular phone timing. These include the patents of Sorden (U.S. Pat. No. 5,311,197), Watters, et al. (U.S. Pat. No. 5,982,324), Lemelson, et al. (U.S. Pat. No. 5,983,161), Janky, et al. (U.S. Pat. No. 5,918,183), Hawkes, et al. (U.S. Pat. No. 5,973,643), and Sheffer, et al. (U.S. Pat. No. 5,218,367).

Other location inventions include Krasner (U.S. Pat. No. 6,016,119) which locates diving objects and Cox (U.S. Pat. No. 4,598,272) for monitoring a child or pet.

The electronics of radio direction timing is dealt with in several US patents. Illustrative of these are the inventions of Buford, et al. (U.S. Pat. No. 5,945,948), Aljadeff, et al. (U.S. Pat. No. 5,729,196), Yokev, et al. (U.S. Pat. Nos. 5,596,330; 5,592,180; 5,583,517; and 5,379,047), and Leitch (U.S. Pat. No. 6,002,342).

In spite of decades of work on radio direction finding for military and government uses and the widely understood need for a practical car locator, no practical car locator has been taught.

SUMMARY OF THE INVENTION

The basic object of this invention is a small hand-held locator for the automobile operator which will attach to a key chain or fit in a wallet, pocket, or purse. This small portable unit will communicate with a unit attached to an automobile to enable the operator to locate the automobile. It is a further object of this invention to locate children or pets. The applications of the disclosed technique could be used to locate a large number of objects such as motor vehicles, boats, human beings and animals. It is a further object of this invention to use the air pressure to direct one to the correct floor in a parking ramp. Another object is a car locator without radio communication but rather by navigation to a stored location. It is a further object of this invention to navigate to a desired object by the use of velocity, position, acceleration, GPS, magnetic field, radio frequency, audio frequency, or local navigation system or any combination of these.

It is a further object of this invention to use a cellular phone as a card locating device. It is a further object of this invention to have an apparatus conveniently store floor and zone information.

DETAILED DESCRIPTION OF THE INVENTION

In the following detailed description, reference is made to the accompanying drawings which form a part hereof and in which is shown by way of illustration specific embodiments in which the invention can be practiced. These embodiments are described in sufficient detail to enable those skilled in the art to practice and use the invention, and it is to be understood that other embodiments may be utilized and that electrical, logical, or structural changes may be made without departing from the spirit and scope of the present invention. The following detailed description is, therefore, not to be taken in a limiting sense and the scope of the present invention is defined by the appended claims and their equivalents.

Figure 1:
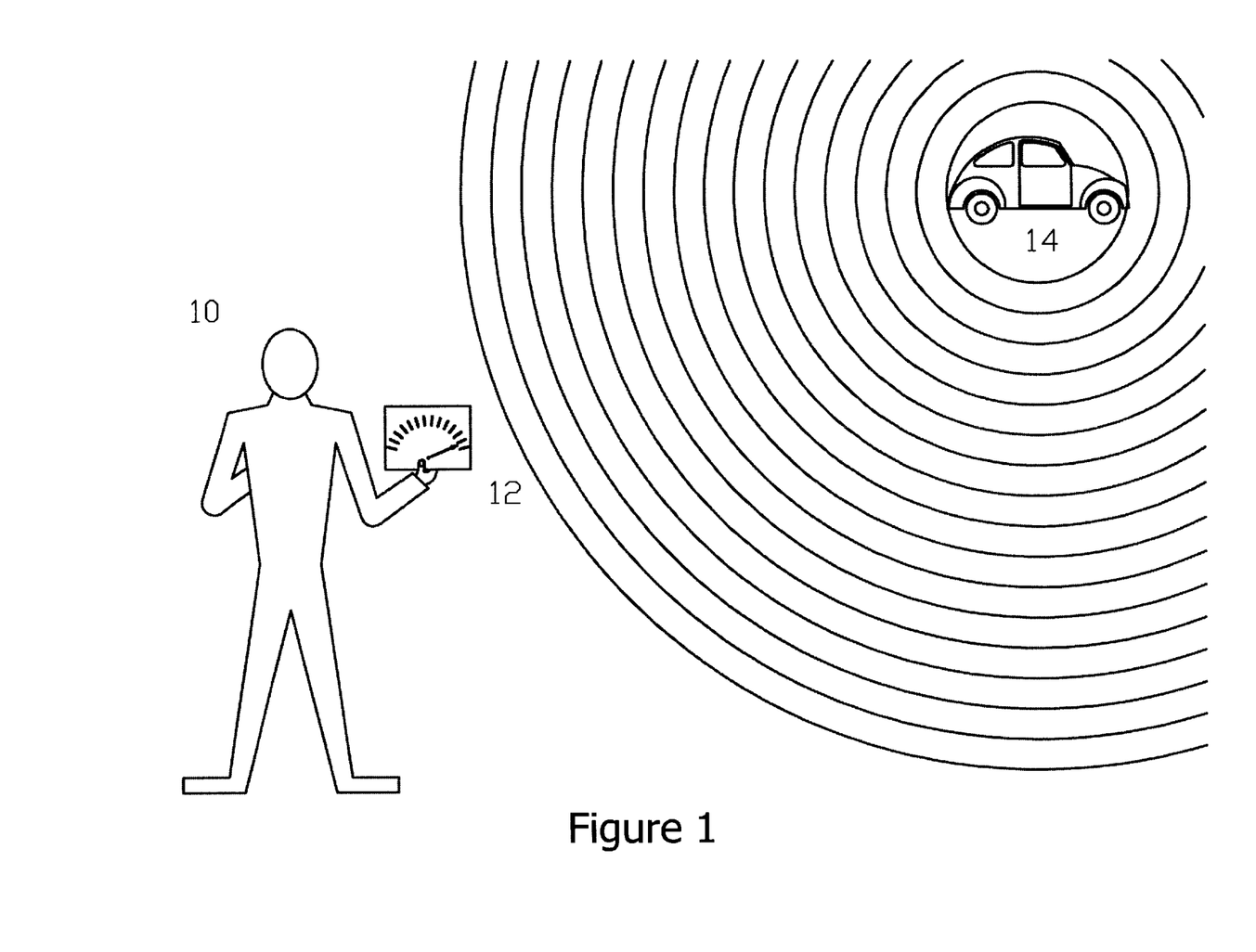
FIG. 1 shows the operator and motor vehicle.

FIG. 1 shows an operator 10 holding a portable unit 12 between the thumb and forefinger. Automobile unit 14 is transmitting the signal which is received by the portable unit 12.

Figure 2:
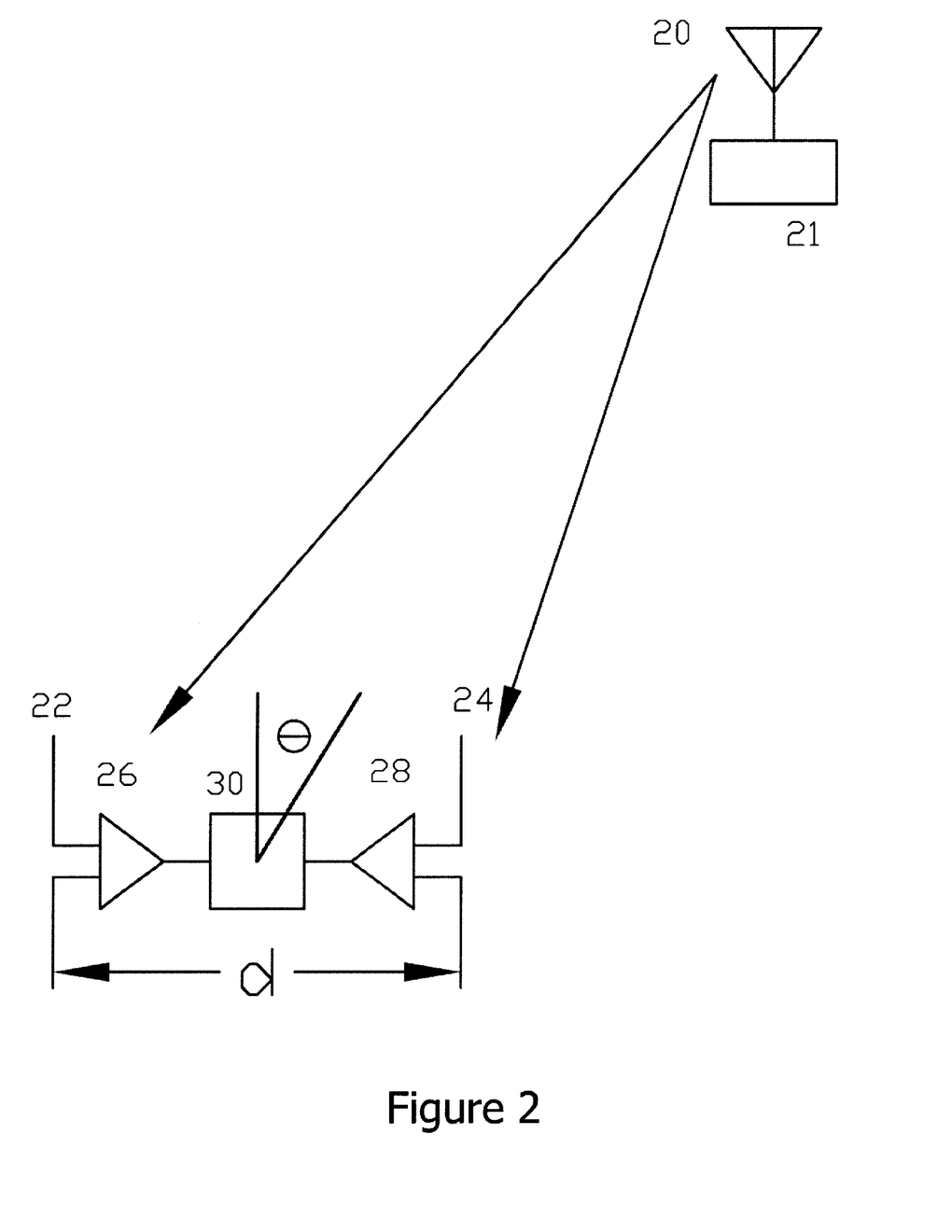
FIG. 2 shows the antennas involved.

FIG. 2 depicts the basic elements of the invention. The automobile unit has an antenna 20 powered by the base unit 21 which together transmit a signal along the vectors shown to the portable unit. These are received by the left dipole antenna 22 and right dipole antenna 24. The signals are fed, respectively, through high frequency amplifiers 26 and 28 to the main circuitry 30. The spacing d is ideally about 8 cm to allow the antenna to fit into the left and right sides of a conventional credit card size device. However, spacings from 4 cm out to 20 cm would function adequately and allow the unit to fit into a checkbook outline or "personal data assistant."

Many frequencies could be used for the device. Ideal frequencies would include the 900 MHz and 2.4 GHz ISM (Industrial, Scientific and Measurement) bands. Amplifiers are available from a number of sources including Maxim of Sunnyvale, California, Phillips Semi-Conductors of Sunnyvale, California, and Celeritek of Santa Clara, Calif.

To understand the operation of the invention the following simple algebra is required.

Assume:

c=speed of light f=frequency of the radio frequency source d=8 cm (8.6 cm=credit card width)

$\Delta$=d cos θ cm where $\Delta$ is the increase in distance to the furthest antenna t=$\Delta$/c=d cos θ/c seconds where t is the arrival time difference p=1/f seconds where p is the period of the RF signal φ=360 t/p=360 f d cos θ/c gives the phase between the 2 antennas $$\cos\theta = \left[\frac{c\phi}{360fd}\right]$$

relates the bearing to the phase difference

And finally the bearing in degrees to the transmitter is given by:

$$\theta = \arccos\left[\frac{c\phi}{360fd}\right]$$

For an example:

Assume we are using the frequency of 900 MHz and a spacing d of 8 cm. If the car is at a bearing angle θ of 45° from the main axis of the portable unit then:

$\Delta$=d cos 45°

$\Delta$=5.66 cm t=0.189 ns p=1.11 ns

φ (phase delay)=61°

All that the portable unit would "know"are the antenna spacing "d", the frequency "f" of the transmission, the speed of light "c", and the detected phase delay, "φ".

Plugging those numbers into the equation for θ gives:

$$\theta = \arccos\left[\frac{3\cdot 10^8 \text{ cm/s}\cdot 61°}{360°\cdot 900 \text{ MHz}\cdot 8 \text{ cm}}\right] = 45°$$

Figure 3:
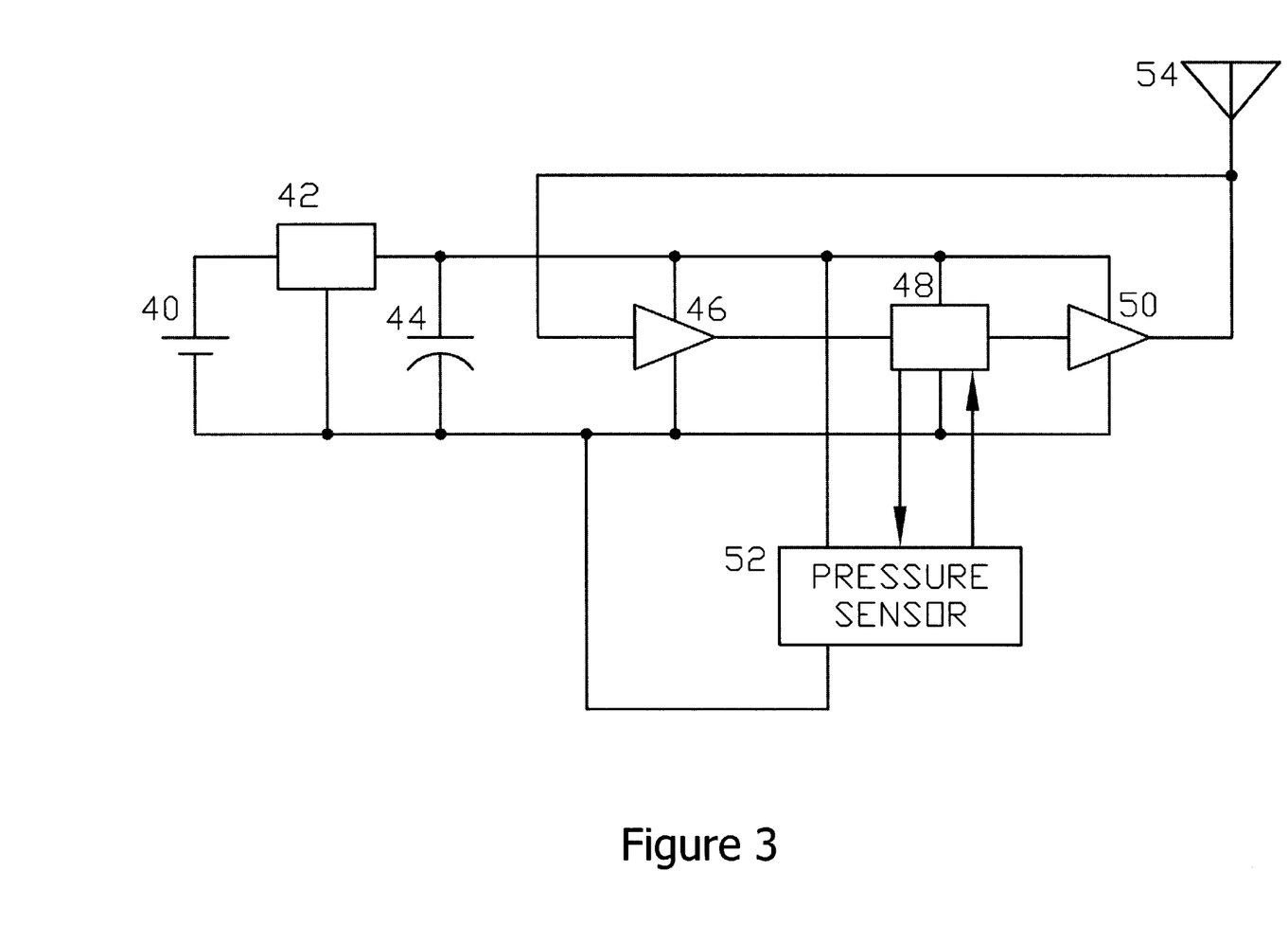
FIG. 3 shows the circuitry of the automobile unit.

FIG. 3 shows the schematic of the car unit. Battery 40 is the energy source. Battery 40 could be any type of energy source including the car battery, rechargeable batteries, or a primary replaceable cell. Preferably, it is a solar cell so that the operator does not need to worry about changing batteries or running wires to the car electrical system. Voltage buffer 42 is used to charge the temporary storage unit 44 to supply power if the unit is out of the sunlight. Temporary storage unit 44 could be a double layer capacitor or any type of many rechargeable batteries. The antenna 54 is monitored (while the unit is in the receiving mode) by input amplifier 46 which can be of the same type as those shown in FIG. 2. That signal is fed to control unit 48 for processing.

Control unit 48 includes a high frequency oscillator which is available from Maxim of Sunnyvale, California or from a large number of other sources. Its output is fed through a power amplifier 50 and finally to the antenna 54. The output amplifier could be one of a large number of amplifiers including the Maxim model 2720, or a Temic model TST0912 available from Amtel in San Jose, Calif., a Phillips (Sunnyvale, Calif.) model BFG45W, a Celeritek (Santa Clara, Calif.) model CMM2301, or a Motorola model MRFICO919. Motorola is located at Dallas, Tex.

Alternatively, one could use a combination receiver and output amplifier such as the National Semiconductor model LMX3162. National Semiconductor is located at national.com. Pressure sensor 52 is connected to control unit 48. The control unit 48 only turns the sensor on when needed. One pressure sensor is the Sensym model SCC15ASMT. Sensym is located at Sensym.com. Another pressure sensor is the Max1457 available from Maxim.

Pressure sensors have long been used to estimate altitude for aircraft and hikers. Illustrative examples are those mentioned in Nitta, et al. (U.S. Pat. No. 5,224,059), Kubota, et al. (U.S. Pat. No. 5,802,016), Mladenovic (U.S. Pat. No. 5,783,853), and Pitchford, et al. (U.S. Pat. No. 4,977,509).

Figure 4:
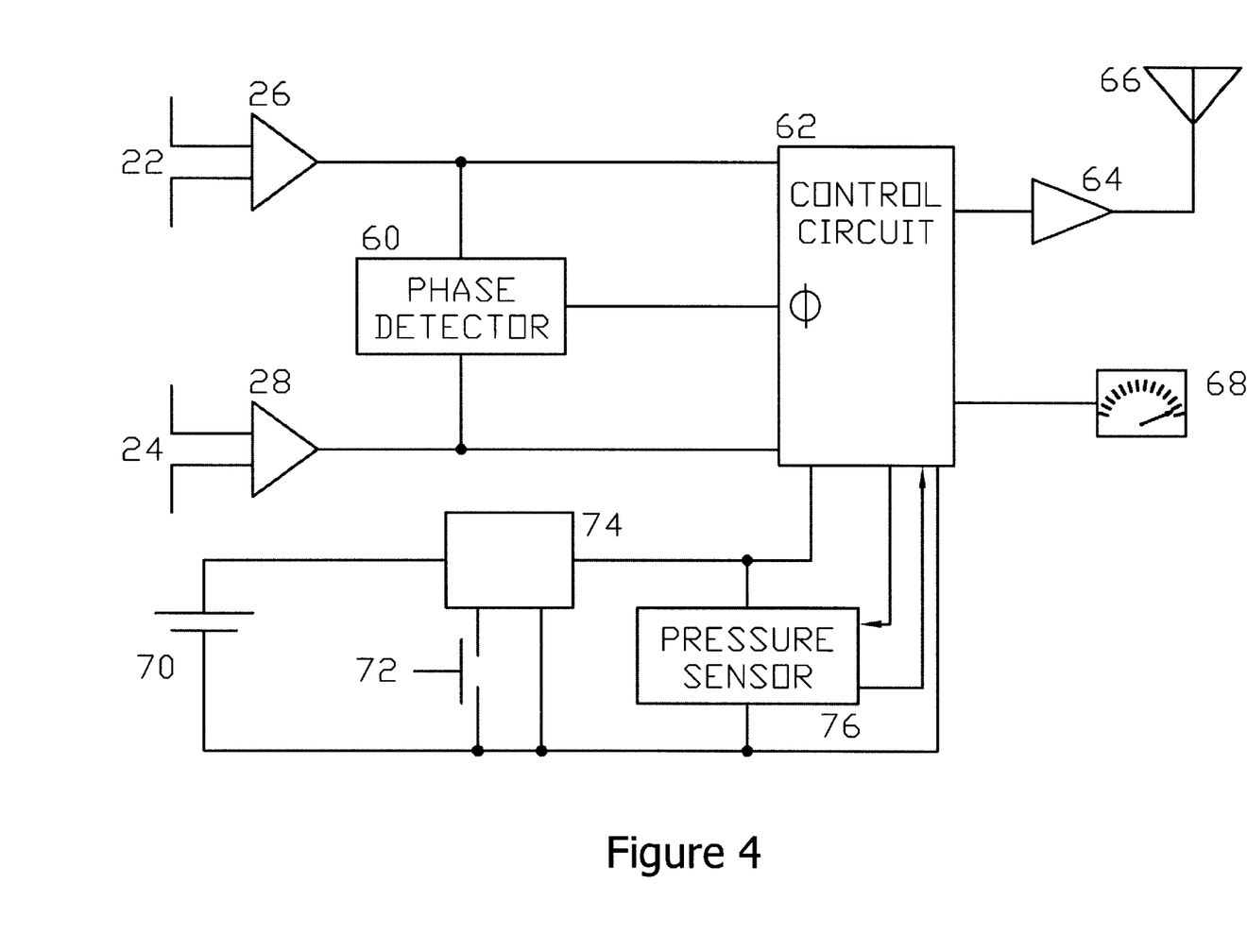
FIG. 4 shows the circuitry of the hand-held unit.

FIG. 4 gives a detailed operation of the hand-held unit. Antennas 22 and 24 are amplified by left and right amplifiers 26 and 28. These signals are then fed into phase detector 60. Illustrative phase detectors are available from Maxim, M-Pulse Microwave of San Jose, Calif., and MicroMetrics of Londonderry, N. H. The phase signal is fed into the control circuit 62 for an analysis as described in the flow chart of FIG. 5. The transmit output from the control circuit 62 is fed into power amplifier 64 and thence to output antenna 66. The bearing output is fed into the bearing display 68 to enable the operator to know which direction to walk in.

A small battery 70 is connected to on/off control 74 which is powered by the battery output and controlled itself by the push-button 72. The pressure sensor 76 is powered from this source and is both controlled by and gives information to the control circuit 62.

Figure 5:
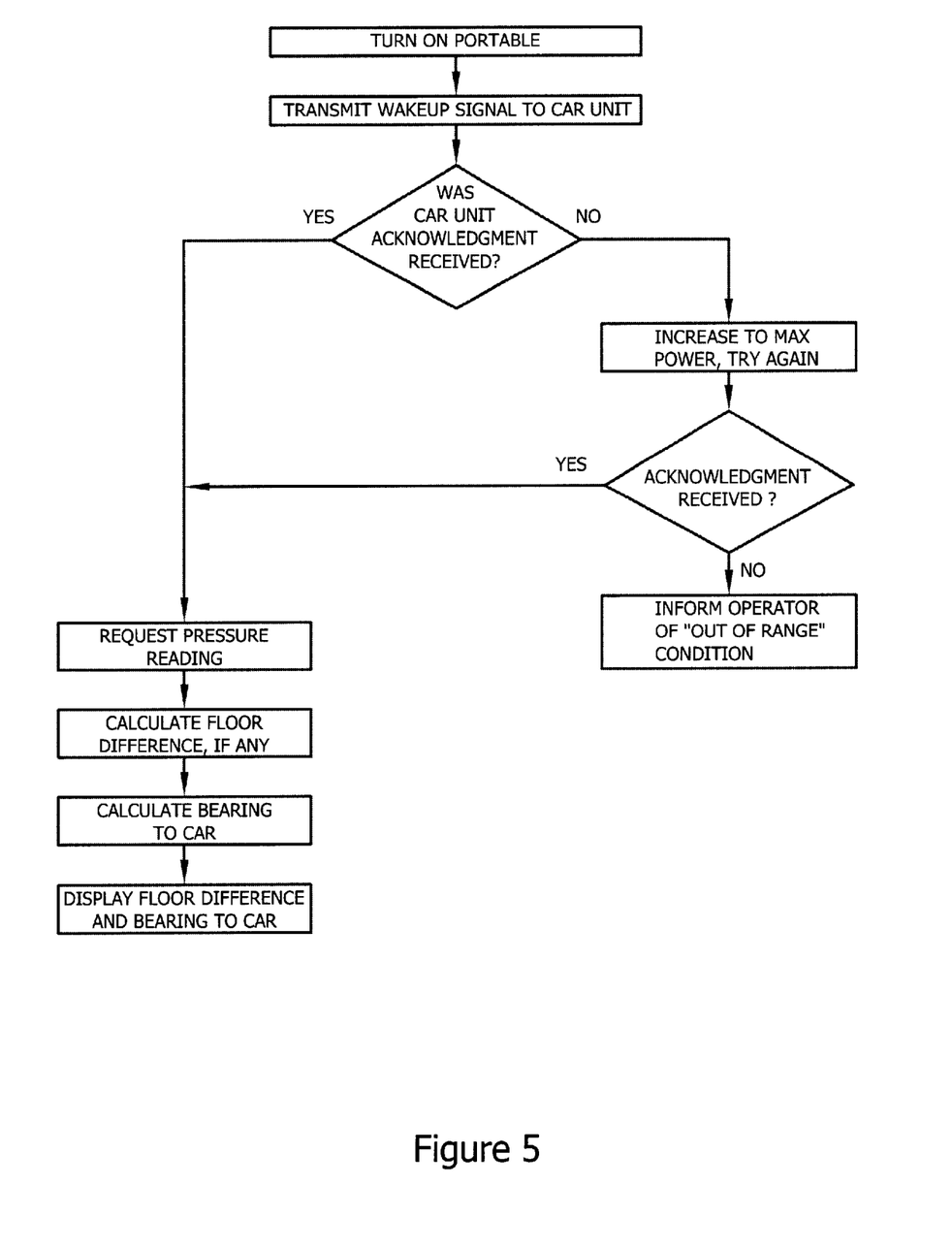
FIG. 5 shows the method of operation of the portable unit.

FIG. 5 gives the method of operation of the portable unit. The first step is that the operator must turn on the portable unit. At the next step the portable unit will transmit a wake-up signal to the car unit. This signal will have a unique code to avoid confusion between different operators. Then the portable unit will ask if the car unit has sent an acknowledgment. If not, then the portable unit will increase its output to maximum power and try again. If acknowledgment is received at this point then everything is fine and the device goes to normal operation. If the acknowledgment is not received then the unit will inform the operator of an out-of-range condition. Alternatively, the car unit needs no wakeup but continuously transmits at a low duty cycle—for example for 100 µs every 50 ms.

If the car unit acknowledgment was received then the portable unit will request a pressure reading to be transmitted from the car unit. The portable unit will then calculate a floor difference, if any, between the operator and the car unit. This is based on the simple relationship that each 1,000 feet of elevation results in a change of approximately 1 inch of mercury pressure difference. Therefore a pressure difference of 0.01 inches of mercury would signify about a 10-foot difference which would mean that the operator is off one floor in the ramp. Since there are 2 inches of mercury in one pound per square inch the differentiation of one floor requires a resolution of 0.005 pounds per square inch in pressure between the two units. This resolution and noise is well within the capabilities of the Sensym pressure sensor, for example.

The portable unit will then calculate the bearing angle to the car by using the equation given above. It will then go on to then display the floor difference, if any, to the operator along with the calculated bearing angle.

As an alternative embodiment, the portable unit need not calculate the bearing angle from the phase difference. Rather, in this simplest version, the unit would merely display an indication of signal strength. The operator would hold the unit in front of their body and rotate their body and arms while keeping the unit in front. Since the body blocks most of the higher frequency signals, this technique would allow a rough estimate of the direction to the car. This "body blocking" embodiment would have the lowest cost.

As a further alternative embodiment, the portable unit could be packaged operably with a cellular telephone. The cellular phone display, battery, keypad, and microcontroller could all be shared with the locator apparatus. In addition, the audio output of the cell phone could be used to guide the operator to turn "left" or "right" for example. The body blocking embodiment would have the most synergy with the cellular phone. The single antenna and single channel RF amplifiers would suffice for this approach. For details on cell phone design see: U.S. Ser. No. 6,115,597 (Disposable Emergency Cellular Phone) and application: U.S. Ser. No. 09/584,326 filed May 30, 2000 (Generic Number Cellular Telephone).

Figure 6:
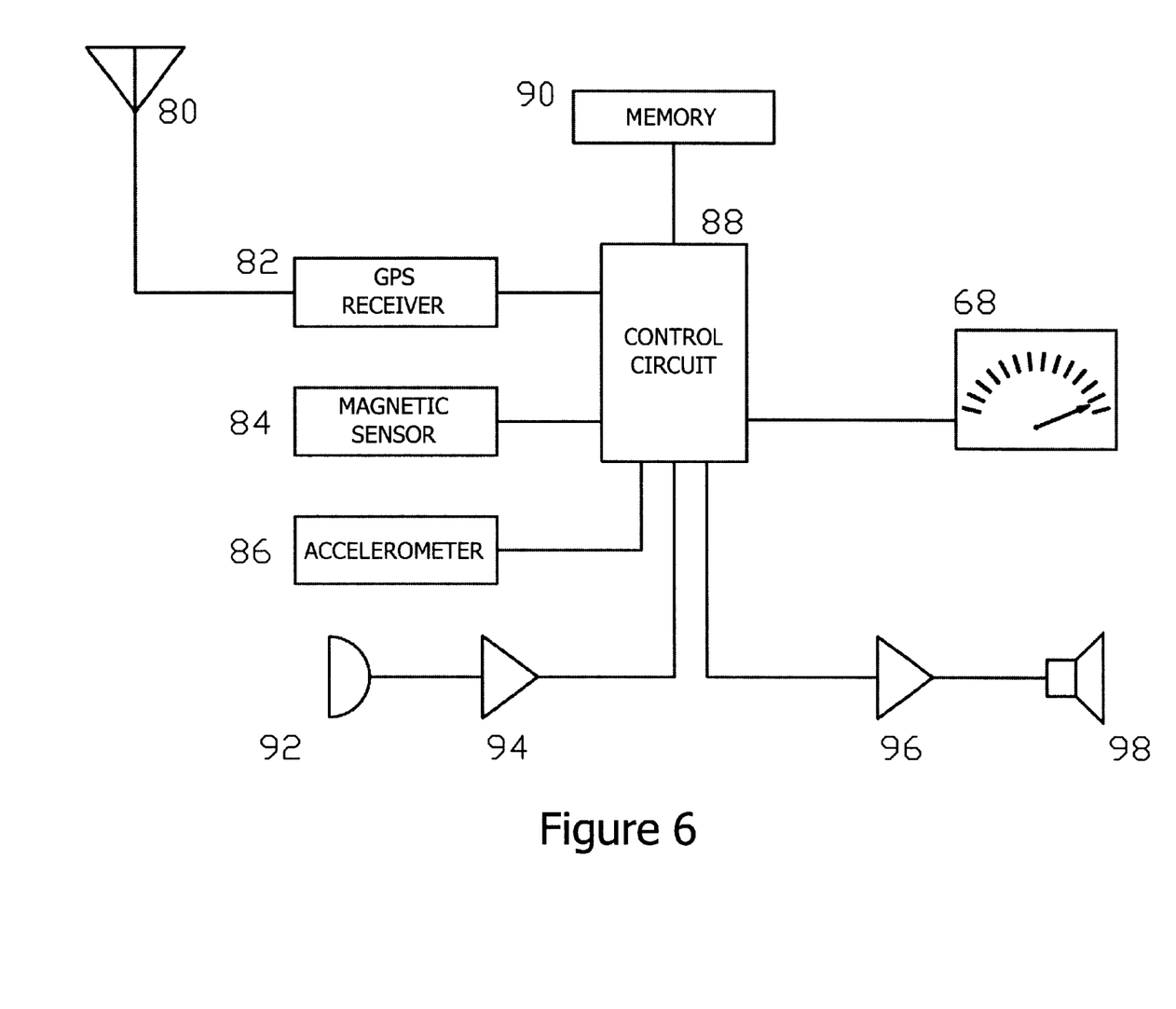
FIG. 6 shows an alternative embodiment using a magnetic sensor and GPS receiver.

FIG. 6 gives the circuitry of an alternative embodiment of the invention. This embodiment could also be combined with the preferred embodiment to give more foolproof operation at a longer range.

A GPS antenna 80 is fed into GPS receiver 82 and that signal goes to a control circuit 88. A suitable GPS circuit can be built from the Philips SAA1575HL and UAA1570HI, integrated circuits. A magnetic sensor 84 is then fed into the control unit 88 as well. Finally, an accelerometer circuit 86 feeds into the control circuit. The output of the control circuit is the heading display 68. A suitable magnetic sensor is the Honeywell HMC1022 available from ssec.honeywell.com or the ADD122151 available from Analog Devices located at analog.com.

Figure 7:
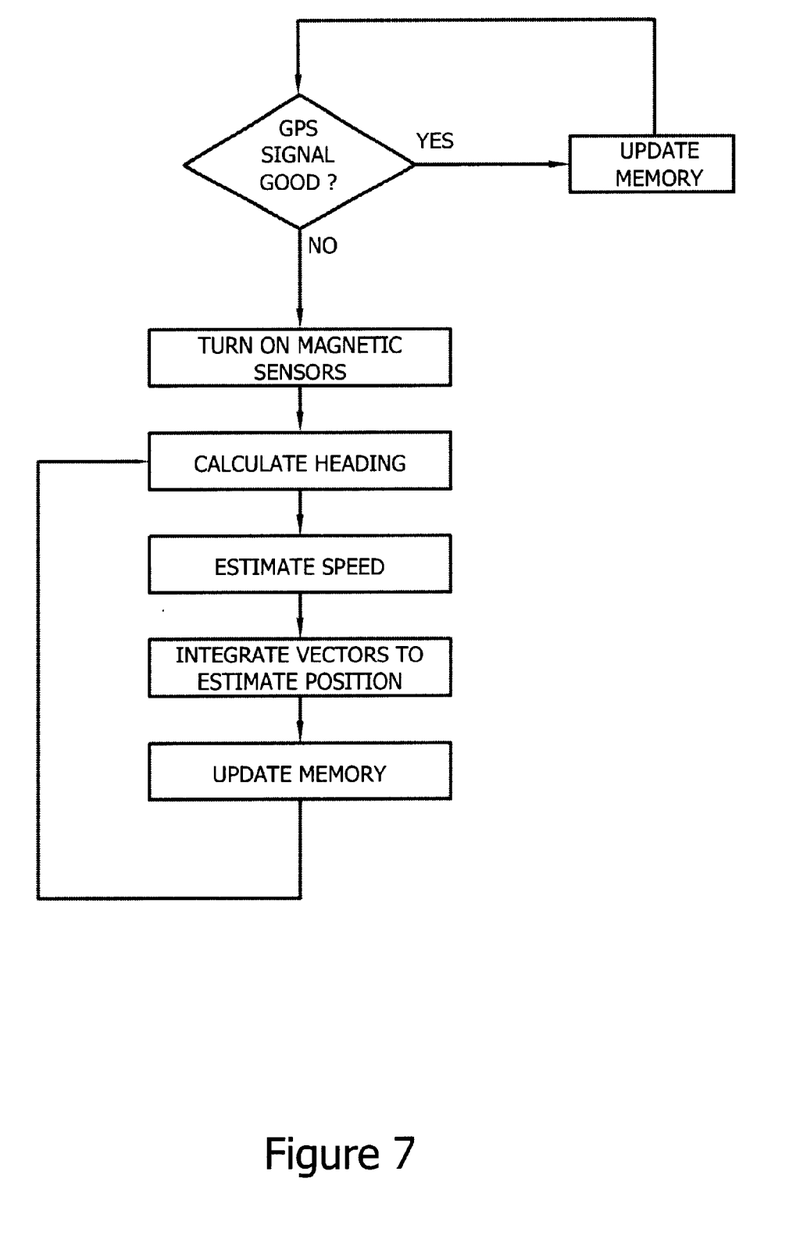
FIG. 7 shows the method of the alternative embodiment using a magnetic sensor and GPS receiver for the car unit.

FIG. 7 gives the operation of this embodiment. To begin with, the automobile unit asks if the GPS signal is good. If it is, then it will update the memory with the current position and continue operation. If the GPS signal is not good, then the unit will turn on its magnetic sensor. It will then calculate a heading based on the compass information given from those magnetic sensors. The unit will also estimate the speed. This could be based on a small radar or sonar unit in the car, accelerometers, or even the signal from the automobile's speedometer. In the next step the speed and heading information vectors are integrated to estimate a position. This position is then used to update the memory and the process continues.

The above requires that the accelerometer be mounted along the main axis of the car. As an alternative to the magnetic sensors, a second accelerometer could be mounted perpendicularly so that the two signals together could be used to estimate heading.

Figure 8:
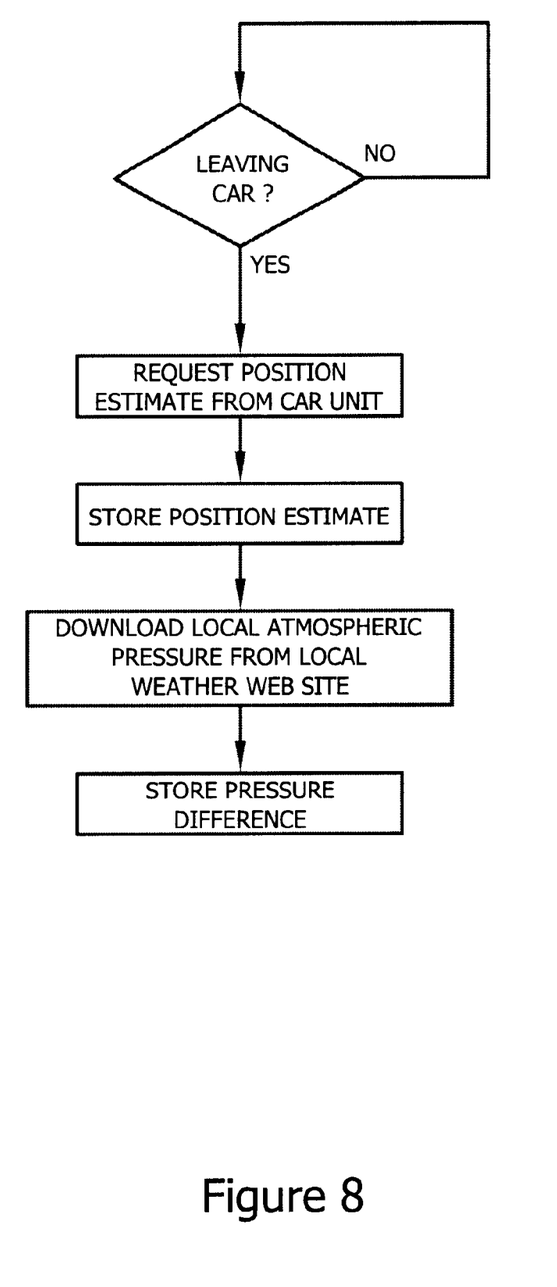
FIG. 8 shows the method of operating the alternative embodiment using a magnetic sensor and GPS receiver for the portable unit exiting the car.

FIG. 8 gives the operation of the portable unit upon exiting the car. Once the portable unit senses that it is leaving the car unit it will request a position estimate from the car unit. The car unit will feed its position information to a modulation circuit which will use the antenna to transmit this information to the handheld unit. The handheld unit has an antenna and a receiver circuit to capture this information. This position estimate will be stored, in both the car unit and the handheld unit, for the duration of the operation and used upon return.

As a further alternative embodiment, the portable unit will continuously update its own location independently of the car unit. With this embodiment there is not need for the portable unit to sense that it is leaving the car unit in order to store the car location. The operator can merely push a button to request that the location be stored. Alternatively, the portable unit is the only unit and the car unit is dispensed with altogether. The portable unit would then continuously update the position until the operator signaled that they had parked. The portable unit would then store the parking position. Upon return, the portable unit would execute the algorithm in FIG. 9 as described below.

Figure 9:
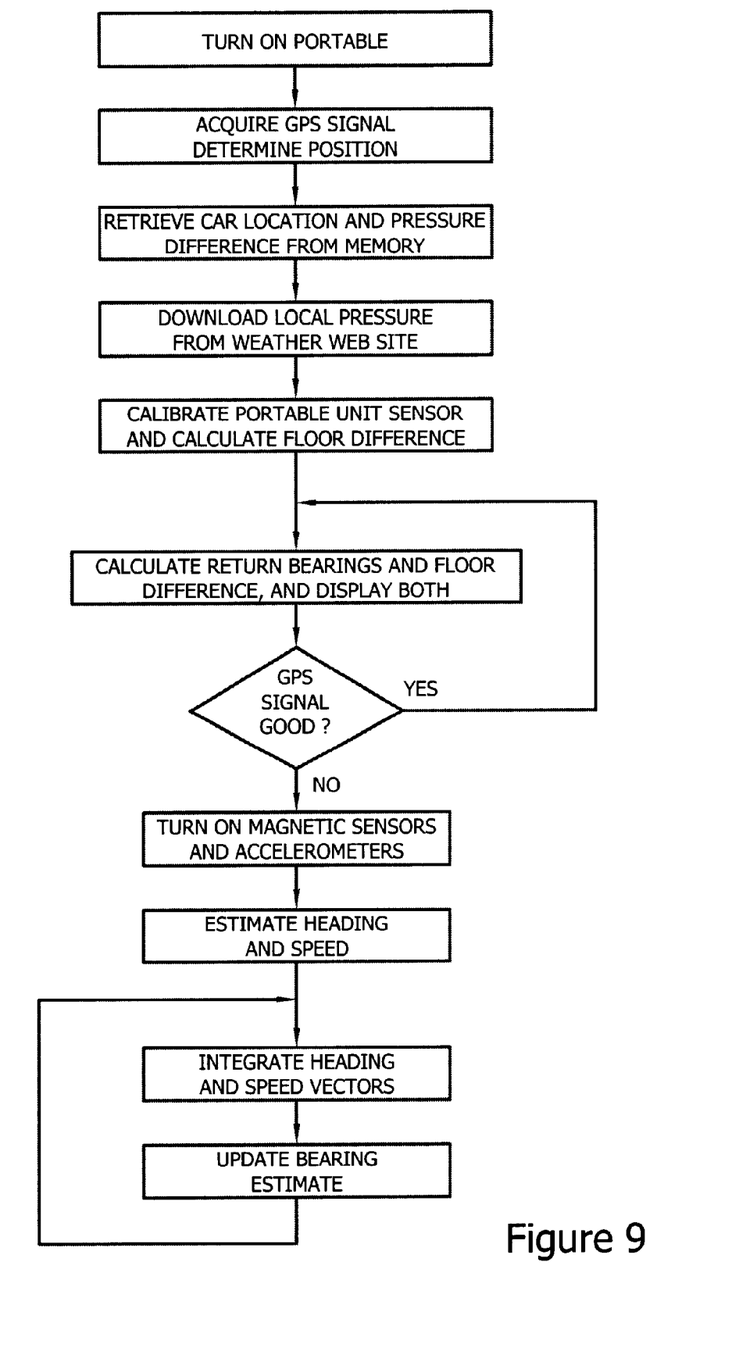
FIG. 9 shows the method of operation of the alternative embodiment using a magnetic as sensor and GPS receiver for the portable unit.

FIG. 9 gives the operation of the portable unit while searching for the car. Initially the operator must turn on the portable unit. The portable unit will then attempt to acquire a GPS signal to determine position. It will retrieve the car location from memory in the next step. It will then calculate a return bearing and display that bearing to the operator. As long as the GPS signal is good it will continue to calculate a return bearing to display to the operator. Once a GPS signal is lost then the unit will turn on the magnetic sensors and accelerometers. Suitable accelerometers are available from Analog Devices.

The unit will then estimate the heading and speed from the magnetic compass and accelerometer information. It could also use an estimate based on normal walking speed as long as there is some acceleration to suggest motion.

The unit will then integrate the heading and speed vectors to estimate a position of the operator both absolute and relative to the car unit. The unit will then update the bearing estimate and display that to the operator and continue.

An improvement on this embodiment uses the GPS signal to finely tune the magnetic compass readings and accelerometer velocity estimates. During normal driving on straight stretches of road, the control unit will compare the headings as estimated by the magnetic compass ad the velocity estimates from the accelerometers to those calculated from the GPS. The scaling and offset factors for the other sensors will then be modified to match the GPS.

The portable unit for this "navigating" embodiment could be built into a cellular telephone. This would allow the synergistic use of the battery and display. Note that this embodiment does not require the two antennae of the first embodiment. Also, one could combine the digital controller functions and some of the radio frequency amplification. Alternatively one could build the second unit into a personal data assistant. For details on cell phone design see: U.S. Ser. No. 6,115,597 (Disposable Emergency Cellular Phone) and application: U.S. Ser. No. 09/584,326 filed May 30, 2000 (Generic Number Cellular Telephone).

The system could use a "local" GPS which would be broadcast at a different frequency for each floor. This service would be attractive for parking customers and helpful for the lot operators as they would not have to drive customers around looking for their lost cars.

High frequency directional sources would be mounted in the corners of each floor. The customers cell phone would preferably be the interface. It would do all of the communications and would be used by the operator to register on the way out of the car by pushing a single button. On return the customer would log in and the system would direct them to the car. The base system would have the car location stored and would calculate the customer's position while walking. By differentiating the customers' position, the base system could correct their heading.

Instead of a local GPS, the base system could determine the location of the customer's cell phone by cell phone location approaches such as those taught and referenced in applications: U.S. Ser. No. 09/098,315 filed Jun. 16, 1998 (Public Service Answering Point With Automatic Triage Capability); and U.S. Ser. No. 09/406,067 filed Sep. 24, 1999 (Aircraft Internal EMI Detection and Location). The local positioning service could be an enhanced 911 location system. For example, the cell phone could make a nonemergency location query and store that location upon exiting the car. Upon returning to the car the operator would query the local cell phone location service for the car location and receive a bearing back to the car.

The base system could also use high frequency ultrasonics for the location signal.

As another alternative embodiment, the first unit could be build into the rearview mirror. This would provide good height for RF transmission and good sunlight for the solar cells.

The preceding specific embodiments are illustrative of the practice of the invention. It is to be understood, therefore, that other expedients known to those skilled in the art or disclosed herein may be employed without departing from the invention or the scope of the appended claims. For example, the present invention is not limited to the use of any particular circuits for electrical functionality. The present invention is also not limited to use in conjunction with locating cars, but may find further application in other relevant areas such as location of any object with a cooperative or noncooperative transmitter. The present invention further includes within its scope the use of other techniques described herein in conjunction with the application of different physical properties for location and different types of technology to utilize those properties.

In the claims, means plus function clauses are intended to cover the structures described herein as performing the recited function and their equivalents. Means plus function clauses in the claims are not intended to be limited to structural equivalents only, but are also intended to include structures which function equivalently in the environment of the claimed combination.

We claim:

1. A personal vehicle cooperative location system comprising a first unit mounted within or about the personal vehicle further comprising a power source operably connected to a radio frequency source which is operably connected to an antenna and a second unit which is handheld and housed with a personal data assistant further comprising a power source operably connected to at least two radio frequency amplifiers which receive signals from at least two radio frequency antennae which amplifiers' outputs are operably connected to phase detection circuitry configured to calculate the angle from the second unit main axis to the first unit so that an operator may use the second unit to find the direction to the first unit mounted within or about the personal vehicle.

2. A personal vehicle cooperative location system comprising a first unit mounted with a rearview mirror of a personal vehicle further comprising a power source operably connected to a radio frequency source which is operably connected to an antenna and a second unit which is handheld further comprising a power source operably connected to at least two radio frequency amplifiers which receive signals from at least two radio frequency antennae which amplifiers' outputs are operably connected to phase detection circuitry configured to calculate the angle from the second unit main axis to the first unit so that an operator may use the second unit to find the direction to the first unit mounted within or about the personal vehicle.

3. A personal vehicle cooperative location system comprising a first unit mounted within or about the personal vehicle further comprising a power source operably connected to a radio frequency source which is operably connected to an antenna and a second unit which is handheld further comprising a power source operably connected to at least two radio frequency amplifiers which receive signals from at least two radio frequency antennae which amplifiers' outputs are operably connected to phase detection circuitry configured to calculate the angle from the second unit main axis to the first unit so that an operator may use the second unit to find the direction to the first unit mounted within or about the personal vehicle and pressure sensors associated with each of the first and second unit to estimate the number of floors of height between them.

4. A method of locating an operator's personal vehicle comprising the steps of: placing a radio frequency transmitter within or about the vehicle, providing a source of power to the transmitter, carrying a handheld phase sensitive multiple antenna receiver housed with a personal data assistant, holding the receiver in front of the operator's body, calculating a direction to the vehicle from the phase relationships between the multiple antenna signals, and indicating the approximate bearing to the vehicle.

5. A method of locating an operator's personal vehicle comprising the steps of: placing a radio frequency transmitter within the vehicle on or about the rearview mirror, providing a source of power to the transmitter, carrying a handheld phase sensitive multiple antenna receiver, holding the receiver in front of the operator's body, calculating a direction to the vehicle from the phase relationships between the multiple antenna signals, and indicating the approximate bearing to the vehicle.

6. A method of locating an operator's personal vehicle comprising the steps of: placing a radio frequency transmitter within or about the vehicle, providing a source of power to the transmitter, carrying a handheld phase sensitive multiple antenna receiver, holding the receiver in front of the operator's body, calculating a direction to the vehicle from the phase relationships between the multiple antenna signals, indicating the approximate bearing to the vehicle, having the first and second unit each use a pressure sensor to estimate the number of floors of height between them.

7. A method of locating an operator's personal vehicle comprising the steps of: placing a radio frequency transmitter within or about the vehicle, providing a source of power to the transmitter using at least one solar cell, carrying a handheld phase sensitive multiple antenna receiver housed with a personal data assistant, holding the receiver in front of the operator's body, calculating a direction to the vehicle from the phase relationships between the multiple antenna signals, and indicating the approximate bearing to the vehicle.

* * * * *